United States Patent [19]

Schmitt et al.

[11] Patent Number: 4,692,382

[45] Date of Patent: Sep. 8, 1987

[54] ELASTOMERIC COATING COMPOSITIONS

[75] Inventors: Robert J. Schmitt; Leon A. Perez, both of Pittsburgh; Robert A. Montague, Allison Park; Marvin T. Tetenbaum, Pittsburgh; Ellor J. Van Buskirk, Pittsburgh, all of Pa.

[73] Assignee: PPG Industries, Inc., Pittsburgh, Pa.

[21] Appl. No.: 887,455

[22] Filed: Jul. 21, 1986

[51] Int. Cl.$^4$ .................. B32B 27/38; B05D 3/02; C08F 283/00

[52] U.S. Cl. .................. 428/414; 427/407.1; 427/410; 428/416; 428/418; 428/421; 428/422; 525/111; 525/119; 525/461; 525/462; 525/463; 525/465; 525/523; 525/528; 525/529; 525/531

[58] Field of Search .............. 525/461, 462, 463, 465, 525/531, 529, 523, 528, 111, 119; 427/407.1, 410, 409, 386; 428/414, 418, 421, 422, 425.8

[56] References Cited

U.S. PATENT DOCUMENTS

| | | | |
|---|---|---|---|
| 3,215,668 | 11/1965 | Bissinger et al. | 260/47 |
| 3,248,414 | 4/1966 | Stevens | 260/463 |
| 3,248,415 | 4/1966 | Stevens | 260/463 |
| 3,428,416 | 4/1966 | Stevens | 260/463 |
| 3,660,523 | 5/1972 | Grawe et al. | 260/47EN X |
| 3,764,457 | 10/1973 | Chang et al. | 161/183 |
| 3,912,790 | 10/1975 | Chang et al. | 260/849 |
| 4,024,113 | 5/1977 | Ammons | 260/77.5 |
| 4,035,548 | 7/1977 | Chang et al. | 428/412 |
| 4,062,887 | 12/1977 | Chang et al. | 560/185 |
| 4,160,853 | 7/1979 | Ammons | 428/425 |
| 4,259,472 | 3/1981 | Chattha et al. | 528/72 |
| 4,282,123 | 8/1981 | Ilaria | 260/18 |
| 4,434,278 | 2/1984 | Skiscim | 525/531 |
| 4,470,828 | 9/1984 | Yamamura et al. | 44/51 |
| 4,514,037 | 4/1985 | Lewarchik et al. | 525/438 |
| 4,530,947 | 7/1985 | Kojo et al. | 523/450 |

OTHER PUBLICATIONS

PPG Technical Bulletin 950, Duracarb TM 140 *Series Polycarbonate Diol Intermediates for Polyurethanes.*
PPG Technical Bulletin 951, DURACARB TM 120 *Series Polycarbonate Diol Intermediates for Polyurethanes.*
Rosthauser, Williams, "Blocked Isocyanates in Coatings", *Modern Paint and Coatings*, Feb. 1985, pp. 78–85.

*Primary Examiner*—Thurman K. Page
*Attorney, Agent, or Firm*—Linda Pingitore

[57] ABSTRACT

A coating composition has as its principal constituents
 (i) an isocyanate terminated urethane containing material; and
 (ii) a phosphatized polyepoxide essentially free of oxirane groups.

The coating composition has excellent elongation and is particularly useful as a coating applied directly to metal. The coating composition is also useful as a primer in the preparation of multilayer coatings having good flexibility.

26 Claims, No Drawings

ELASTOMERIC COATING COMPOSITIONS

BACKGROUND OF THE INVENTION

The present invention relates to flexible coating compositions.

In the production of precoated metal for the fabrication of structural building components such as building panels, the physical properties of the coating composition are of paramount importance. The composition must not only exhibit excellent durability properties and adhesion to the substrate, but it must also be sufficiently flexible to permit fabrication without cracking and loss of adhesion.

There is a need, therefore, for a coating composition which exhibits not only excellent flexibility, but also good adhesion, crack resistance and corrosion resistance on the edges of fabricated parts.

SUMMARY OF THE INVENTION

In accordance with the present invention there is provided a coating composition comprising:
 (i) an isocyanate terminated urethane containing material; and
 (ii) a phosphatized polyepoxide essentially free of oxirane groups.

Also provided in accordance with the present invention is a method of providing a substrate with a multilayer coating comprising:
 (a) applying a flexible primer coating composition to a substrate, said coating composition comprising (i) an isocyanate terminated urethane containing material; and (ii) a phosphatized polyepoxide essentially free of oxirane groups;
 (b) applying at least one pigmented coating composition to the coated substrate of (a);
 (c) at least partially curing the coated substrate of step (b);
said multilayer coating having an elongation of at least 50 percent when cured.

DETAILED DESCRIPTION OF THE INVENTION

The coating composition of the present invention comprises two principal constituents. The first of these constituents is an isocyanate terminated urethane containing material. Preferably this material is a polyurethane which is prepared from a polyol component and an organic polyisocyanate.

In addition to being prepared from a polyol component and an organic polyisocyanate, the isocyanate terminated urethane containing material can also be prepared by reacting a polyisocyanate with the reaction product of urea and a glycol. This urethane containing material also contains same proportion of urea groups.

Alternatively, the isocyanate terminated urethane containing material can be prepared by reacting a polyisocyanate with either (1) the reaction product of an amino containing material such as an amine with a carbonate; or (2) the reaction product of a mixture of an amino containing material such as an amine and a hydroxy containing material such as an alcohol with a carbonate; or (3) the reaction product of a hydroxy containing material such as an alcohol with a carbonate.

In the preferred embodiment the polyol component can be a single organic polyol or a mixture of organic polyols. Examples of the many suitable polyols include acrylic polyols, polyester polyols, polyether polyols, polysulfide polyols, and polycarbonate polyols. If desired, the polyol component can be a mixture of polymeric polyol and monomeric diol. In one preferred embodiment the polyol component is a mixture of polymeric polycarbonate diol and monomeric diol.

Examples of polyether polyols are polyalkylene ether polyols which include those having the following structural formula:

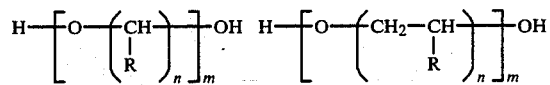

where the substituent R is hydrogen or lower alkyl containing from 1 to 5 carbon atoms including mixed substituents, and n is typically from 2 to 6 and m is from 10 to 100 or even higher. Included are poly(oxytetramethylene)glycols, poly(oxyethylene)glycols, poly(oxy-1,2-propylene)glycols and the reaction products of ethylene glycol with a mixture of 1,2-propylene oxide and ethylene oxide.

Also useful are polyether polyols formed from oxyalkylation of various polyols, for example, glycols such as ethylene glycol, 1,6-hexanediol, Bisphenol A and the like, or other higher polyols, such as trimethylolpropane, pentaerythritol and the like. Polyols of higher functionality which can be utilized as indicated can be made, for instance, by oxyalkylation of compounds such as sorbitol or sucrose. One commonly utilized oxyalkylation method is by reacting a polyol with an alkylene oxide, for example, ethylene or propylene oxide, in the presence of an acidic or basic catalyst.

Polyester polyols can also be used as the polyol component of the invention. Polyester polyols can be prepared by the polyesterification of an organic polycarboxylic acid or anhydride thereof with organic polyols and/or an epoxide. Usually, the polycarboxylic acids and polyols are aliphatic or aromatic dibasic acids and diols.

The diols which are usually employed in making the polyester include alkylene glycols, such as ethylene glycol, neopentyl glycol and other glycols such as hydrogenated Bisphenol A, cyclohexanediol, cyclohexanedimethanol, caprolactonediol, for example, the reaction product of epsilon-caprolactone and ethylene glycol, hydroxy-alkylated bisphenols, polyether glycols, for example, poly(oxytetramethylene)glycol and the like. Polyols of higher functionality can also be used. Examples include trimethylolpropane, trimethylolethane, pentaerythritol and the like, as well as higher molecular weight polyols such as those produced by oxyalkylating lower molecular weight polyols.

The acid component of the polyester consists primarily of monomeric carboxylic acids or anhydrides having 2 to 18 carbon atoms per molecule. Among the acids which are useful are phthalic acid, isophthalic acid, terephthalic aid, tetrahydrophthalic acid, hexahydrophthalic acid, adipic acid, azelaic acid, sebacic acid, maleic acid, glutaric acid, chlorendic acid, tetrachlorophthalic acid, decanoic acid, dodecanoic acid, and other dicarboxylic acids of varying types. The polyester may include minor amounts of monobasic acids such as benzoic acid, stearic acid, acetic acid, hydroxystearic acid and oleic acid. Also, there may be employed higher polycarboxylic acids such as trimellitic acid and tricarballylic acid. Where acids are referred to above, it is understood that anhydrides of those acids which form anhydrides can be used in place of the acid. Also, lower alkyl esters of the acids such as dimethyl glutarate and dimethyl terephthalate can be used.

Besides polyester polyols formed from polybasic acids and polyols, polylactone-type polyesters can also be employed. These products are formed from the reaction of a lactone such as epsilon-caprolactone and a polyol. The product of a lactone with an acid-containing polyol can also be used.

In addition to the polyether and polyester polyols, hydroxy-containing acrylic polymers or acrylic polyols can be used as the polyol component.

Among the acrylic polymers are interpolymers of about 0.2 to 10 percent by weight hydroxy-containing vinyl monomers such as hydroxyalkyl acrylate and methacrylate having 2 to 6 carbon atoms in the alkyl group and 90 to 99.8 percent by weight of other ethylenically unsaturated copolymerizable materials such as alkyl acrylates and methacrylates; the percentages by weight being based on the total weight of the monomeric charge.

Examples of suitable hydroxyalkyl acrylates and methacrylates are acrylic acid and methacrylic acid esters of ethylene glycol and propylene glycol. Also useful are hydroxy-containing esters and/or amides of unsaturated acids such as maleic acid, fumaric acid, itaconic acid and the like.

Examples of suitable alkyl acrylates and methacrylates are lauryl methacrylate, 2-ethylhexyl methacrylate and n-butyl acrylate.

Besides the acrylates and methacrylates, other copolymerizable monomers which can be copolymerized with the hydroxyalkyl acrylates and methacrylates are ethylenically unsaturated materials such as monoolefinic and diolefinic hydrocarbons, halogenated monoolefinic and diolefinic hydrocarbons, unsaturated esters of organic and inorganic acids, amides and esters of unsaturated acids, nitriles and unsaturated acids and the like. Examples of such monomers include styrene, 1,3-butadiene, acrylamide, acrylonitrile, alpha-methyl styrene, alpha-methyl chlorostyrene, vinyl butyrate, vinyl acetate, allyl chloride, divinyl benzene, diallyl itaconate, triallyl cyanurate and mixtures thereof. Usually these other ethylenically unsaturated materials are used in admixture with the above-mentioned acrylates and methacrylates.

Also useful herein are polysulfide polyols. One such group of materials are PERMAPOL® P-3 polyols commerically available from PRC, Inc. These materials are liquid polyether/thioether diols or polyols. Other types of polysulfide polyols can also be utilized herein.

The organic polyisocyanate which is used to prepare the isocyanate terminated urethane containing material is usually an aliphatic or an aromatic diisocyanate or a mixture of the two. Higher polyisocyanates can also be utilized. Examples of suitable aromatic diisocyanates are 4,4'-diphenylmethane diisocyanate, 1,3-phenylene diisocyanate, 1,4-phenylene diisocyanate and toluene diisocyanate. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include 1,4-cyclohexyl diisocyanate, isophorone diisocyanate, and 4,4'-methylene-bis-(cyclohexyl isocyanate). Examples of suitable higher polyisocyanates are 1,2,4-benzene triisocyanate, poly-methylene polyphenyl isocyanate, and isocyanurates and biurets of the diisocyanates described above.

The preferred aliphatic polycarbonates are exemplified by Stevens, U.S. Nos. 3,248,414; 3,248,415 and 3,248,416. These essentially linear aliphatic polycarbonates are comprised of a multiplicity of carbonate and ether linkages terminated by hydroxyl groups. These patents (herein incorporated by reference in their entirety) teach the preparation of polycarbonates from: (1) carbon dioxide and 1,2-epoxides; (2) cyclic carbonates such as ethylene carbonate, or (3) from cyclic carbonates and a 1,2-epoxide. A minor amount of a polyol is employed as an initiator. The reaction is usually conducted under pressure in the presence of a metal carbonate, metal hydroxide, tri-sodium phosphate or a tertiary amine.

A typical polycarbonate hereby provided using ethylene oxide as the 1,2-epoxide may be represented by this structural formula:

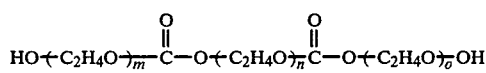

wherein subscripts m, n, o, etc., are positive whole integers of 1 or more. The repeating polyethylene oxide units —CH$_2$—CH$_2$—O— may vary in length. Hence, subscripts m, n, o, etc., may represent different whole positive integers of 1 or greater. Usually, these repeating units are such that the subscripts are no greater than 8. The number of carbonate units,

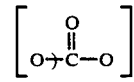

in these polycarbonates range from 2 to 20, more usually, however, the molecule has from 3 to 10 such units. With a different 1,2-epoxide, the repeating units separated by carbonate groups will correspond to ethers and polyethers of the epoxide.

The epoxides which can be reacted with carbon dioxide include: ethylene oxide, propylene oxide, or like olefinically saturated and unsaturated aliphatic 1,2-epoxides of up to and including 5 carbon atoms. Such compounds are often referred to an oxiranes. Other branched epoxides can be used such as 4-vinyl cyclohexene monoxide. Mixtures can also be employed but ethylene oxide is the preferred oxide.

Exemplary of initiators useful in preparing the polycarbonate of the aforesaid Stevens' patents include diols of the structure HO—R—OH wherein R is an alkylene radical of at least 2 carbons up to 25 or more, such as ethylene glycol, diethylene glycol, triethylene glycol, propylene glycol and dipropylene glycol, or even water can be employed. The polyols preferably have from between 2 and about 10 carbon atoms; and preferably not more than about 4 hydroxyl groups. The compounds with more hydroxyl groups such as sugars tend to result in discoloration, and best results have generally been found with diols having no ether linkages such as ethylene glycol and propylene glycol and more preferably the former. Exemplary of suitable triols are glycerol, trimethylolethane and trimethylolpropane. A suitable tetrol is pentaerythritol. Also, cycloaliphatic diols such as 1,3-dihydroxy cyclopentane and aromatic dihydroxy compounds such as catechol, bisphenols, and xylene glycols are useful. Besides polyols, however, other organic compounds having at least 2 active hydrogens, usually from 2 to 4, can be employed. By active hydrogen is meant a hydrogen linked directly to a nitrogen, sulfur or oxygen atom such as is found in hydroxy, non-tertiary amino, mercapto, and carboxyl groups. These include polyamines, mercaptans, alkylolamines, and the like, such as are illustrated in column 6 of U.S. Pat. No. 3,248,415.

Conventional reaction ratios and conditions can be employed such as, for example, 1 to 6 moles of alkylene oxide per mole of carbon dioxide, and a polyol in an amount sufficient to give between 0.01 to 0.2 mole per mole of ethylene oxide when a polycarbonate low in carbonate linkages is desired having a molecular weight between about 750 and about 5,000. When more carbonate linkages are desired, an alkylene carbonate such as ethylene carbonate can be reacted with a polyol such as ethylene glycol in a carbonate to glycol mole ratio in the range of 1.2:1 to 2.5:1 with removal of ethylene glycol.

The temperature of the reaction will vary from between about 160° and about 300° C.

Polycarbonates encompassed herein can be made by several known methods. For example, aliphatic diols can be reacted with bischloroformates of aliphatic diols in the presence of inert solvents and acid acceptors, e.g., tertiary amines. By this method, polycarbonates can be prepared without ether linkages. Other methods are disclosed in Sears (U.S. Pat. No. 3,186,961) and Bissinger et al (U.S. Pat. No. 3,215,668).

In addition, polycarbonates can be prepared from glycols such as ethylene, propylene and diethylene glycols and dialkylcarbonates such as diethyl carbonate and dimethyl carbonate, by a transesterification reaction. Aromatic carbonates such as di-phenyl carbonate can also be employed.

In a preferred embodiment the polycarbonate polyols commercially available from PPG Industries, Inc., under the registered trademark designation DURA-CARB ® are utilized. Generally, suitable polycarbonate diols have a number averge molecular weight within the range of from about 150 to about 10,000, preferably from about 500 to 5,000 and more preferably from 850 to 2,000. The number average molecular weights are determined by gel permeation chromatography (GPC) using a polystyrene standard.

The isocyanate groups of the isocyanate terminated urethane containing material can also be blocked if desired. In the preferred embodiment, the isocyanate group can be blocked after the isocyanate terminated urethane containing material is prepared, or alternatively, the polyisocyanate can be partially blocked before being reacted with the polyol component. Alternatively, the polyisocyanate can be reacted with a portion of the polyol component, then partially blocked, and subsequently reacted with remaining polyol and blocking agent. Blocking the isocyanate groups can be used as a means to form stable one-package systems. The isocyanate terminated urethane containing material with free isocyanate groups can be used to form two-package room temperature curable systems.

A wide variety of blocking agents can be utilized. Examples of suitable blocking agents are those materials which would unblock at elevated temperatures such as lower aliphatic alcohols such as methanol; oximes such as methyl ethyl ketone oxime; and lactams such as epsilon-caprolactam. In a preferred embodiment of the present invention the isocyanate groups of the isocyanate terminated urethane containing material are blocked with epsilon caprolactam.

The isocyanate-terminated urethane containing material can be present in the claimed coating composition in an amount ranging from about 50 percent to about 95 percent, preferably from about 80 percent to about 90 percent, the percentages being based on the total resin solids content of the coating composition. These percentages are not intended to be limiting since slight variations of these amounts are contemplated.

The second principal constituent of the claimed coating composition is a phosphatized polyepoxide essentially free of oxirane groups.

The polyepoxides which are phosphatized are those materials having a 1,2 epoxide group present in the molecule. Hydroxyl groups may also be present and often are. Polyepoxides contain more than one 1,2-epoxy group per molecule. In general, the epoxide equivalent weight can range from about 280 to about 4,000. These polyepoxides are saturated or unsaturated, cyclic or acyclic, aliphatic, alicyclic, aromatic or heterocyclic. They can contain substituents such as halogen, hydroxyl and ether groups.

One useful class of polyepoxides comprises the epoxy polyethers obtained by reacting an epihalohydrin (such as epichlorohydrin or epibromohydrin) with a polyphenol in the presence of an alkali. Suitable polyphenols include resorcinol, catechol, hydroquinone, bis(4-hydroxyphenyl)-2,3-propane, i.e., bisphenol A; bis(4-hydroxyphenyl)-1,1-isobutane; 4,4-dihydroxybenzophenone; bis(4-hydroxyphenyl)-1,1-ethane; bis(2-hydroxynaphthenyl)-methane; and 1,5-hydroxynaphthalene. One very common polyepoxide is a polyglycidyl ether of a polyphenol, such as bisphenol A.

Another class of epoxy resins are the polyglycidyl ethers of polyhydric alcohols. These compounds may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, trimethylolpropane, and bis(4-hydroxycyclohexyl)-2,2-propane.

Another class of epoxide resins are the polyglycidyl esters of polycarboxylic acids. These compounds are produced by the reaction of epichlorohydrin or a similar epoxy compound with an aliphatic or aromatic polycarboxylic acid such as oxalic acid, succinic acid, glutaric acid, terephthalic acid, 2,6-naphthalene dicarboxylic acid and dimerized linoleic acid.

Still another class of polyepoxides are derived from the epoxidation of an olefinically unsaturated alicyclic compound. These polyepoxides are non-phenolic and are obtained by epoxidation of alicyclic olefins, for example, by oxygen and selected metal catalysts, by perbenzoic acid, by acid-aldehyde monoperacetate or by peracetic acid. Among such polyepoxides are the epoxy alicyclic ethers and esters well known in the art.

Useful polyepoxides also include those containing oxyalkylene groups in the epoxy molecule. Another class of polyepoxides consists of the epoxy novolac resins. These resins are obained by reacting an epihalohydrin with the condensation product of aldehyde and monohydric or polyhydric phenols. A typical example is the reaction product of epichlorohydrin with a phenolformaldehyde condensate.

Another group of epoxide containing materials include acrylic copolymers containing copolymerized glycidyl acrylate or methacrylate units. These acrylic copolymers can be prepared by the reaction of alkyl esters of alpha,beta unsaturated mono- or di-carboxylic acids with either glycidyl acrylate or methacrylate. Other glycidyl containing copolymerizable monomers such as diglycidyl itaconate and diglycidyl maleate also can be used. These monomers can be optionally copolymerized in the presence of other copolymerizable monomers such as vinyl aromatic compounds, such as styrene or vinyl toluene, and also acrylonitrile or methacrylonitrile.

It should be understood that mixtures of the foregoing polyepoxides can be utilized if desired.

The aforedescribed polyepoxides are phosphatized such that they are essentially free of oxirane groups. The phosphatization is carried out by coreacting the polyepoxide with a source of orthophosphoric acid and then hydrolyzing the resultant product. The hydrolysis step is believed to be important in achieving an essentially oxirane free product.

Phosphoric acid source materials include one hundred percent orthophosphoric acid, the semi-hydrate $2H_3PO_4.H_2O$ and aqueous solutions. Condensed forms of phosphoric acid such as pyrophosphoric acid and triphosphoric acid can also be utilized. Typically aqueous phosphoric acid solutions, especially 70 to 90 percent solutions, will be preferred.

The epoxide-acid reaction can be carried out with or without the presence of a reaction medium. Preferably a reaction medium is utilized. Exemplary of media which are suitable include acetone, methyl ethyl ketone, methylene chloride, diethylene glycol monobutyl ether, glycol ethers, isopropanol, and ethanol.

The reaction is usually carried out by dissolving the selected polyepoxide or mixture of polyepoxides in the desired medium, if one is utilized, and adding the source of phosphoric acid. The mixture is heated and allowed to exotherm. The mixture is then hydrolyzed with water and then the product is permitted to cool.

The hydroxyl functional phosphatized polyepoxide essentially free of oxirane groups generally has a number average molecular weight within the range of from about 200 to about 100,000. The ratio of hydroxyl equivalents in the phosphatized polyepoxide to the isocyanate equivalents in the isocyanate-terminated urethane containing material generally ranges from about 0.5:1 to 1.5:1.

The phosphatized polyepoxide is present in the claimed coating composition in an amount ranging from about 5 percent to about 49 percent, preferably 9 percent to 15 percent, the percentages being based on the total resin solids content of the coating composition.

It should be understood that in one embodiment of the present invention the phosphatized polyepoxide essentially free of oxirane groups can be present as an isocyanate terminated prepolymer which is formed by reacting at least a portion of the hydroxyls of an oxirane free phosphatized polyepoxide with an organic polyisocyanate. If desired, the isocyanate groups can be blocked as previously described. In the instance where all of the hydroxyls are reacted in forming the prepolymer, additional active hydrogen containing material such as a polyol can be added as a crosslinker.

A very important aspect of the aforedescribed coating composition is its flexibility as evidenced by the elongation of the cured coating. The claimed coating compositions when cured generally have an elongation of at least 50 percent, preferably at least 100 percent, and more preferably within the range of from about 200 percent to about 300 percent. The elongation is determined with an Instron Tester according to ASTM D638-72. The test is conducted at a speed of 20 inches per minute utilizing a sample measuring 0.25 inch in width. The sample is taken from a "free film", that is, one which has been removed from the substrate. (Briefly, the coating composition is applied onto a substrate which has been penetrated with a lubricant that permits the cured film to be peeled from the substrate). The flexibility of the claimed compositions is particularly advantageous when the coating compositions are utilized as direct to metal primers in forming a substrate with a multilayer coating. The flexibility of the primer contributes greatly to the flexibility of the multicoat system. This flexibility is especially useful in the coil coating area because flat coils of substrate can be coated first and then fabricated into the desired article without detracting from the appearance properties.

Another very important aspect of the aforedescribed coating compositions is the excellent adhesion particularly after fabrication of coated parts and exposure to severe environments. The coating compositions demonstrate excellent durability in conjunction with outstanding flexibility.

It should be understood that in addition to the components described above, the claimed coating compositions useful as primers also can contain pigments and additives known to those skilled in the art. Moreover, the compositions are typically prepared in a suitable solvent to facilitate formulation and application.

Several different pigments can be used in the compositions. Inorganic pigments which are useful include titanium dioxide, silica, iron oxides, talc, mica, clay, zinc oxide, strontium chromate, zinc chromate, carbon black, lead chromate, molybdate orange, calcium carbonate, and barium sulfate. Organic pigments can also be used herein.

Suitable solvents include the aromatic petroleum distillates, cyclohexane, methyl ethyl ketone, methyl isobutyl ketone, alcohols such as ethyl alcohol, propyl alcohol and diacetone alcohol, dimethyl phthalate, and mono- and dialkyl ethers of ethylene and diethylene glycol, such as ethylene glycol monoethyl ether, ethylene glycol monobutyl ether, ethylene glycol monoethyl ether acetate, diethylene glycol monobutyl ether and diethylene glycol diethyl ether.

Conventional additives include surfactants, antioxidants, ultraviolet light absorbers, stabilizers, rheology control agents, coalescing agents and the like.

The claimed thermosetting coating compositions are typically prepared by combining the ingredients together with mild agitation. When they are formulated as single-package systems with the isocyanate terminated urethane containing material being blocked, the compositions typically require a catalyst such as dibutyltin dilaurate, or other tin catalysts such as dibutyltin diacetate or dibutyltin oxide. The single-package compositions can be cured by heating to a peak metal temperature ranging from about 450° F. (232° C.) to about 500° F. (257° C.). It is believed that the isocyanate blocking agent is liberated thereby facilitating urethane formation between the isocyanate and hydroxyl groups.

The present invention also relates to a method of providing a substrate with a multilayer coating and coated substrates produced by the method.

The method comprises, as a first step, (a), applying a flexible primer coating composition to a substrate, the primer composition having an elongation of at least 50 percent when cured. The primer coating composition utilized in this first step of the method has been described in detail above, therefore, it will not be described again here. As was mentioned in the discussion above, an important aspect of the primer composition which lends to the flexibility of the ultimate multilayer coating is the flexibility as evidenced by the elongation.

The claimed process is suitable for coating a wide variety of metal substrates including steel and aluminum. A variety of steel substrates are available and any of these are suitable herein, for example, cold-rolled steel, hot dip galvanized steel, aluminized steel, as well as steels clad with zinc/aluminum alloys. Once the primer coating composition has been applied to the substrate, in the second step of the method, (b), a pigmented coating composition is applied to the coated substrate of (a). This pigmented coating composition can be applied over the primer coating wet-on-wet, that is, the coated substrate can be subsequently coated without first being dried. Alternatively, the primer can be partially cured by baking prior to the application of the pigmented coat. In a preferred embodiment the coated substrate of step (a) is baked for a period of from about 20 seconds to about 180 seconds at a temperature of from about 200° C. to about 260° C. prior to application of the pigmented coating composition of step (b).

The pigmented coating composition of step (b), which is applied over the primer composition of step (a), can be selected from a wide variety of pigmented coating compositions including those based on polyester resin, acrylic resins, fluorocarbon resins, and vinyl resins such as plastisols. In one preferred embodiment the pigmented coating composition comprises a fluorocarbon polymer. Preferably the pigmented coating composition additionally comprises an adjuvant polymer different from the fluorocarbon polymer and adapted to modify the properties of the fluorocarbon polymer. The adjuvant polymer is preferably an acrylic polymer.

Several different film-forming fluorocarbon polymers are useful in the present invention. Such polymers include the polyvinyl fluorides, polyvinylidene fluorides, vinyl fluoride copolymers, and vinylidene fluoride copolymers. The preferred film-forming fluorocarbon polymer is polyvinylidene fluoride. The copolymers include at least 75 percent by weight, preferably 90 percent or more of vinyl or vinylidene fluoride units. Examples of monomers to be copolymerized with vinyl fluoride or vinylidene fluoride are ethylene, propylene, isobutylene, styrene, vinyl chloride, vinylidene chloride, difluorochloroethylene tetrafluoroethylene, trifluoropropylene, hexafluoropropylene, vinyl formate, vinyl acetate, vinyl propionate, vinyl butyrate, acrylic acid and its salts, methyl methacrylate, allyl methacrylate, acrylonitrile, methacrylonitrile, N-butoxymethyl acrylamide, allyl acetate and isopropenyl acetate. Generally, the amount of fluorocarbon polymer is the claimed compositions ranges from about 45 percent to about 85 percent by weight, preferably from about 65 percent to about 75 percent by weight, the percentages based on the total weight of the resinous components of the composition.

The adjuvant polymer can be selected from a wide variety of polymeric materials which are suitable as modifiers for the fluorocarbon resins. For exampe, suitable modifiers include acrylic resins, polyester resins such as polyols, epoxy resins, and aminoplast resins such as melamine-formaldehyde condensates.

The particular adjuvant resin chosen depends upon the properties which are desired in modifying the fluorocarbon resin. For example, if one desires a softer, more flexible film, one can select a polyester resin whereas if hardness is desirable, one can select an aminoplast resin, acrylic resin or epoxy resin. Mixtures of these adjuvants can also be utilized.

Preferably, the adjuvant resin is an acrylic polymer. The acrylic polymer can be thermoplastic or thermosetting. Suitable thermoplastic acrylic polymers include polymers and copolymers of acrylic acid or methacrylic acid esters, for example, polymers and copolymers of esters formed by the reaction of acrylic or methacrylic acid with suitable alcohols such as methyl alcohol, ethyl alcohol, propyl alcohol, butyl alcohol and 2-ethylhexyl alcohol. One preferred thermoplastic acrylic resin is a copolymer of methyl methacrylate and ethyl acrylate. In one embodiment the thermosetting acrylic polymers are preferred. Suitable thermosetting acrylic polymers include polymers and copolymers of acrylic monomers containing active hydrogens such as the hydroxyalkyl esters of ethylenically unsaturated carboxylic acids and at least one other copolymerizable ethylenically unsaturated monomer. For example, a suitable thermosetting resin is that prepared from 2-hydroxyethyl acrylate, acrylic acid, N-butoxymethyl acrylamide and another copolymerizable ethylenically unsaturated monomer such as styrene, vinyl toluene, methyl styrene or ethyl styrene. The amount of acrylic polymer typically ranges from about 15 percent by weight to about 55 percent by weight, preferably from about 25 percent to about 35 percent by weight, the percentages based on the total weight of the resinous components of the composition.

The polyester and epoxy resins which have been described above in connection with the primer composition can also be utilized as the adjuvant resin. These have been discussed in detail above, therefore, no additional description will be included here. Aminoplast resins can also be utilized as adjuvants and these are described below.

Aminoplast resins are based on the addition products of formaldehyde, with an amino- or amido-group carrying substance. Condensation products obtained from the reaction of alcohols and formaldehyde with melamine, urea or benzoguanamine are most common and preferred herein. These condensation products can be monomeric or polymeric. Condensation products of other amines and amides can also be employed, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandimide, formaguanamine, acetoguanamine, glycoluril, ammelin 2-chloro-4,6-diamino-1,3,5-triazine, 6-methyl-2,4-diamino-1,3,5-trizine, 3,5-diaminotriazole, triaminopyrimidine, 2-mercapto-4,6-diamino-pyrimidine, 3,4,6-tris(ethylamino)-1,3,5-triazine, and the like.

While the aldehyde employed is most often formaldehyde, other similar condensation products can be made from other aldehydes, such as acetaldehyde, crotonaldehyde, acrolein, benzaldehyde, furfural, glyoxal and the like.

The aminoplast resins contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohols such as cyclohexanol, monoethers, of glycols such as CELLOSOLVES and CARBITOLS, and halogen-substituted or other substituted alcohols, such as 3-chloropropanol and butoxyethanol. The preferred aminoplast resins are substantially alkylated with methanol or butanol.

In a further preferred embodiment of the present invention, once the pigmented coating composition has been applied to the primed substrate, in a third step of the method, (c), a clear coating composition can applied to the coated substrate of (b). As was mentioned above for step (b), this clear coating composition can also be applied wet-on-wet over the pigmented composition or alternatively, the pigmented composition can be partially cured by baking prior to the application of the clear coat. In a preferred embodiment the coated substrate of step (b) is baked for a period of from about 20 seconds to about 180 seconds at a temperature of from about 200° C. to about 260° C. prior to application of the clear coating composition of step (c).

The clear coating composition of step (c) which is applied over the pigmented coating composition of step (b) can also be selected from a variety of clear coating compositions. In a preferred embodiment the clear coating composition comprises a fluorocarbon polymer. Preferably the clear coating composition additionally comprises an adjuvant polymer different from the fluorocarbon polymer and adapted to modify its properties. The adjuvant polymer is preferably an acrylic polymer. In this preferred embodiment the clear coating composition comprises from about 45 percent to about 85 percent of fluorocarbon polymer and from 15 percent to 55 percent of acrylic polymer on a resin solids basis. More preferably the clear coating composition comprises from about 65 percent to about 75 percent of the fluorocarbon polymer and from about 25 percent to about 35 percent of the acrylic polymer, on a resins solids basis. The fluorocarbon polymers and acrylic polymers have been described in detail, above, in connection with the pigmented fluorocarbon polymer based coating composition of step (b). The adjuvant polymers described in detail above are also useful here.

The clear coating compositions can be formulated with the same types of solvents and additives as have been described above in connection with the pigmented coating composition. The clear compositions are, of course, unpigmented.

Once the clear coating composition is applied, the primed substrate coated with pigmented and clear compositions is baked at a temperature of from about 200° C. to about 260° C. for a period ranging from about 20 seconds to about 180 seconds. This final baking step has the effect of removing the solvent present as well as causing the coating layers to fuse together in a bonding process.

The substrate with the multilayer coating is extremely flexible as is evidenced by an elongation of the cured system of at least 50 percent, preferably at least 100 percent and more preferably within the range of from about 200 to 300 percent. The elongation is determined as has been described above in connection with the primer composition. In addition, the coated substrate has excellent durability and resistance to weathering and aggressive environments.

The multilayer coating systems of the present invention can be prepared at a variety of dry film thicknesses depending upon the number of layers and the thickness of each layer. For a three coat system the film thickness of the system is generally within the range of 2.0 mils to 4.5 mils. For a two coat system the dry film thickness of the system usually ranges from about 1.0 mil to about 3.0 mils. The dry film thickness of the primer coating composition usually ranges from about 0.2 mil to about 1.5 mils; the dry film thickness of the pigmented coating composition ranges from about 0.5 mil to about 1.5 mils; and the dry film thickness of the clear coating composition ranges from about 0.2 mil to about 1.0 mil. It should be understood that these ranges are not intended to be limiting since thicknesses outside of these ranges are contemplated.

Thus, the claimed multilayer coated substrates are superior for ease of fabrication; also, they demonstrate excellent adhesion, abrasion resistance, mar resistance, and resistance to weathering and industrial pollutants. The clear coating contributes greatly to this result. In addition to acting as a barrier to minimize the transfer of corrosive pollutants to the underlying layers, it is also very important to the mar resistance.

The following examples are only illustrative of the claimed invention and are not intended to limit it to their details.

EXAMPLE I

This Example illustrates the preparation of a blocked isocyanate terminated urethane containing material for use according to the present invention.

| Charge | Ingredients | Parts by Weight (grams) |
| --- | --- | --- |
| I | isophorone diisocyanate | 1000 |
|  | DURACARB ® 120[1] | 1904 |
|  | 1,4-butanediol | 50 |
|  | methyl amyl ketone | 738 |
|  | dibutyltin dilaurate | 0.4 |
| II | epsilon-caprolactam | 412 |
| III | methyl amyl ketone | 177 |

[1]This hydroxyl terminated polycarbonate diol has a nominal molecular weight of 850, a hydroxyl number ranging from 121 to 147 and is commercially available from PPG Industries, Inc.

A reactor vessel equipped with thermometer, stirrer, and nitrogen inlet tube was charged with (I) and heated to a temperature of about 80° C. Following completion of the reaction exotherm and accompanying fall in temperature, the reaction mixture was heated to about 95° C. and held at this temperature until the measured isocyanate equivalent weight was constant. The mixture was then cooled to about 70° C. and Charges (II) and (III) were added. The reaction mixture was heated to about 95° C. and held at about this temperature until the infrared spectrum indicated the disappearance of isocyanate. The resultant product had a number average molecular weight of 2345 as determined by gel permeation chromatography (GPC) using a polystyrene standard; a total solids content of 77.8 percent determined at 110° C. for one hour and a Gardner viscosity of Z4.

EXAMPLE II

A phosphatized epoxide essentially free of oxirane groups, according to the present invention, was prepared in the following manner:

| Charge | Ingredients | Parts by Weight (grams) |
|--------|-------------|-------------------------|
| I | EPON 836 solution[2] | 425.0 |
|   | diethylene glycol monobutyl ether | 106.2 |
| II | phosphoric acid (85 percent) | 27.1 |
| III | deionized water | 31.7 |

[2]A 75 percent solution of EPON 836 (commercially available from Shell Chemical Co.) in a mixture of 50 percent methyl amyl ketone and 50 percent xylene. The final solution had a total solids content of 60 percent and an epoxy equivalent weight of 280 to 400 on solids.

A suitably equipped reactor vessel was charged with (I) and agitated for 15 minutes. Charge (II) was then added and the mixture was heated to 80° C. As the reaction mixture began to exotherm, the heating was discontinued and the mixture allowed to exotherm to a temperature of about 104° C. The reaction mixture was allowed to cool and then held at a temperature of 80° C. for about 30 minutes. Charge (III) was then added, the reaction mixture was held at about 75° C. for two hours and then it was allowed to cool. The resultant product had a total solids content of 65.1 percent determined at 150° C. for one hour, a Gardner viscosity of Z3 to Z4 and an epoxy equivalent weight of infinity.

EXAMPLE III

This Example illustrates the preparation of a coating composition according to the present invention and an evaluation of its physical properties.

| Ingredients | Parts by Weight (grams) |
|-------------|-------------------------|
| phosphatized epoxy[3] | 11.4 |
| blocked isocyanate terminated polyurethane[4] | 106.8 |
| pigment paste[5] | 100.4 |
| dibutyltin dilaurate | 2.0 |
| diacetone alcohol | 37.0 |
| silica[6] | 9.0 |

[3]This phosphatized epoxy essentially free of oxirane groups was that prepared in Example II, above.
[4]This blocked isocyanate terminated urethane containing material was prepared in Example I, above.
[5]The pigment paste was prepared in the following manner:

| Ingredients | Parts by Weight (grams) |
|-------------|-------------------------|
| phosphatized epoxy of footnote (3) | 8.5 |
| diacetone alcohol | 20.0 |
| dibutyltin dilaurate | 0.9 |
| strontium chromate | 36.0 |
| titanium dioxide | 15.0 |

The ingredients were combined together in the order listed and ground to a number 7 Hegman grind using ceramic beads. Subsequently 20.0 parts by weight of diacetone alcohol was added. The paste had a total solids content of 60.2 percent.
[6]Commercially available from PPG Industries, Inc., as LO-VEL 275.

The coating composition was prepared by combining together, in order, the ingredients listed above with mild agitation. The resultant composition had a total solids content of 60.0 percent.

The test panels for evaluation were prepared as below.

A hot dip galvanized steel panel (G90HDG pretreated with BONDERITE 1303) measuring 4 inches × 12 inches, was coated using a wirewound bar with a 0.8 mil thick dried film of the coating composition detailed above. The panel was baked for 40 seconds to a peak metal temperature of 465° F. (240° C.). The cured film had an elongation of 230 to 290 percent determined with an Instron Tester according to ASTM D638-72.

The cured film was also evaluated for pencil hardness, solvent resistance, and adhesion after fabrication.

Pencil Hardness

This was a measure of the resistance of the coating to a pencil indentor. The pencil hardness scale is as follows beginning with 4B which indicates a relatively soft coating and increasing to 10H which indicates a relatively hard coating: 4B, 3B, 2B, B, HB, F, H, 2H, 3H . . . up to 10H.

Solvent Resistance

This was a measure of the film's ability to withstand 100 double rubs with a sponge pad soaked in methyl ethyl ketone. The number of rubs is the number of back and forth rubs across the film. "No effect" means that the film showed no visible evidence of detrimental effect as a result of the solvent. A numerical rating indicates that the film was severely marred and the substrate was visible after being subjected to the indicated number of double rubs.

T-bend Adhesion

The film was evaluated for cracking and loss of adhesion after the coated panel was bent to varying degrees. A 3T bend means that the diameter of the bend is 3 times the thickness of the steel panel. A 2T bend means that the diameter of the bend is 2 times the thickness of the steel panel, and so on. A OT bend means that the panel is bent back over itself 180 degrees and compressed flat.

The film was observed visually for cracking and for removal of the film after a piece of adhesive tape was pressed down onto the film surface and then quickly ripped from the film. The rating was assigned on a scale of 1 to 9. A score of 9 indicated no cracking and no film removal with the tape while a score of 0 indicated severe cracking and complete film removal by the tape. The scores in between indicated varying degrees of cracking and film removal.

The film was also rated for the amount of loss of adhesion as determined by the "Nickel Scratch" test. In this test the edge of a nickel was firmly drawn down along the paint film. The area thus tested was observed for the amount of film removal. The results were rated on a scale of 0 to 9, as above, with a score of 9 indicating no film removal and a score of 0 indicating complete film removal.

The results are set out below.

| Pencil Hardness | Solvent Resistance (greater than 100 double rubs) | Nickel Scratch | 3T (Cracks/Tapes Off) | 2T (Cracks/Tapes Off) |
|---|---|---|---|---|
| H | no effect | 6 | 9/9 | 8/9 |

EXAMPLE IV

This Example illustrates a method of providing a substrate with a three-coat multilayer coating system according to the present invention and an evaluation of the physical properties of the multilayer coating.

A. Preparation of Primer Coating Composition

The primer utilized in this Example was that detailed above in Example III.

B. Preparation of Pigmented Coating Composition

| Ingredients | Parts by Weight (grams) |
| --- | --- |
| thermosetting acrylic polymer[7] | 136 |
| diethylene glycol monobutyl ether | 241 |
| dibasic ester[8] | 7 |
| RESIMENE 731[9] | 26 |
| grind paste[10] | 374 |
| KYNAR 500[11] | 287 |

[7]This thermosetting acrylic polymer is an interpolymer of 62 percent methyl methacrylate, 27 percent ethyl acrylate, 9 percent N—butoxy methyl acrylamide, and 2 percent methacrylic acid at 50 percent resin solids in isophorone.
[8]This ester is commercially available from E. I. Dupont de Nemours as DBE.
[9]This melamine formaldehyde crosslinking agent is commercially available from Monsanto Chemical Corporation.
[10]The grind paste was prepared from the following ingredients in the indicated proportions:

| Ingredients | Parts by Weight (grams) |
| --- | --- |
| thermosetting acrylic polymer of footnote (7) | 78 |
| diethylene glycol monobutyl ether | 85 |
| flow modifier[a] | 4 |
| bentone clay | 4 |
| copper/chromium mixed oxide | 8 |
| red iron oxide | 0.2 |
| titanium dioxide | 16.7 |
| chromium/antimony/titanium mixed oxide | 18 |
| petrolatum wax | 8 |

[a]This homopolymer of 2-ethylhexyl acrylate can be commercially obtained from Monsanto Chemical Corporation as MODAFLOW.
The grind paste was processed by adding ceramic beads to the ingredients and agitating at high speed to a 7.5 Hegman grind.
[11]Polyvinylidene fluoride commercially available from Pennwalt.

The pigmented coating composition was prepared by combining the ingredients together and agitating with ceramic beads at high speed to a 5.5 Hegman grind.

C. Preparation of Clear Coating Composition

| Ingredients | Parts by Weight (grams) |
| --- | --- |
| thermosetting acrylic polymer[12] | 294 |
| isophorone | 309 |
| KYNAR 500 | 319 |
| silica flatting pigment[13] | 11 |
| petrolatum wax | 10 |

[12]This acrylic polymer was detailed above in footnote (7).
[13]Commercially available from Davison as SYLOID 308.

The clear coating composition was prepared by combining the ingredients together and agitating with ceramic beads at high speed to a 5.5 Hegman grind.

The test panels were prepared in the following manner: A hot dip galvanized steel panel (G90HDG pretreated with BONDERITE 1303) measuring 4 inches×12 inches, was coated using a wirewound bar with a 0.8 mil thick dried film of the coating composition detailed above in Example III. The panel was baked for 40 seconds to a peak metal temperature of 465° F. (240° C.). The coated panel was then coated with a 0.8 mil thick film of the pigmented, fluoropolymer-based coating composition detailed above and baked for 40 seconds to a peak metal temperature of 465° F. (240° C.). Finally, the panel which was coated as detailed above was topcoated with the clear, fluoropolymer based coating composition detailed above at a thickness of 0.8 mil. The coated metal panel was then baked for 40 seconds to a peak metal temperature of 465° F. (240° C.). The elongation of the cured three coat multilayer coating was 70 percent determined with an Instron Tester according to ASTM D638-72. In addition to the tests described above in Example III, the test panels were also evaluated for physical properties according to the following tests. The results are set out in Table I, below.

TESTS

Salt Spray

Prior to being subjected to the conditions of this test the coated test panels were prepared as follows: A scribe mark was scored along the length of the center of the panel; three of the edges of the panel were covered with a protective primer coating composition commercially available from PPG Industries, Inc., under the trademark designation MULTIPRIME, so that only one cut edge was exposed; and a 120 degree bend was formed into one side of the panel. The face of the panel was that portion which was flat and free of indentations or markings.

The aforedescribed coated test panels were exposed continuously to a salt water spray (5 percent solution of salt in water) at 100° F. (38° C.) and 100 percent relative humidity according to ASTM B117.

The panels were rated for the average amount of corrosion or loss of paint extending from the scribe mark, bend, and edge (scribe creepage, bend creepage, edge creepage), and the amount of blistering on the face of the panel.

The panels were rated on a scale of 0 to 10 for the amount of corrosion extending from the scribe, bend and edge. A score of 0 for the creepage means that the corrosion had extended seven-eighths of an inch to one inch or more from the scribe, bend, or edge. A score of 10 means that there was essentially no corrosion extending from the particular area. Values within the indicated scale endpoints are indicative of varying degrees of corrosion extending from the particular point as set out below:

| Average Measurement of Corrosion | | Rating |
| --- | --- | --- |
| inches | mm | |
| 0 | 0 | 10 |
| 1/64 | 0.4 | 9 |
| 1/32 | 0.8 | 8 |
| 1/16 | 1.6 | 7 |
| ⅛ | 3.2 | 6 |
| 3/16 | 4.8 | 5 |
| ¼ | 6.4 | 4 |
| ⅜ | 9.5 | 3 |
| ½ | 12.7 | 2 |
| ⅝ | 15.9 | 1 |
| ⅞ to 1 or more | 25 or more | 0 |

The panels were also rated on a scale of 0 to 10 for the amount of blistering. A score of 10 for the blistering means that there was essentially no blistering in the indicated areas of the panel. A score of 0 means that more than 75 percent of the indicated area contained blisters. Values within the indicated scale endpoints are indicative of varying degrees of blistering as set out below. The concentration of the blisters was rated with the following letters: F (few), M (moderate), and D (dense).

| Amount of Area Containing Blisters (Percent) | Rating |
| --- | --- |
| 0 | 10 |
| 1 | 9 |
| 2 | 8 |

-continued

| Amount of Area Containing Blisters (Percent) | Rating |
|---|---|
| 5 | 7 |
| 7 to 10 | 6 |
| 7 to 10, larger spots | 5 |
| 10 to 25 | 4 |
| 25 to 40 | 3 |
| 40 to 60 | 2 |
| 60 to 70 | 1 |
| greater than 70 | 0 |

Humidity Resistance

For this test the coated test panels were used as the ceiling of a condensing humidity chamber (QCT chamber) with the coating directed inwardly to the chamber. The chamber was heated to 140° F. (60° C.) and about a 2 inch level of water was located 3 to 5 inches below the test panels (panels sloped).

The panels were rated on a scale of 0 to 10 for the amount of blistering as has been described above.

The panels were also rated for the amount of loss of adhesion as determined by the "Nickel Scratch" test. This test has been described above.

Reverse Impact Resistance

The cured films were subjected to 60, 90 and 120 inch-pounds of reverse impact according the ASTM D2794. The impacted films were observed visually for the amount of cracking and for the removal of the film after a piece of adhesive tape was pressed down onto the film surface and then quickly ripped from the film. The rating was assigned on a scale of 1 to 9. A score of 9 indicated no cracking and no film removal with the tape while a score of 0 indicated severe cracking and complete film removal by the tape. The scores in between indicated varying degrees of cracking and film removal.

The results appear in Table I, below.

EXAMPLE V

This Example illustrates the preparation of a different blocked isocyanate terminated urethane containing material according to the present invention.

| Charge | Ingredients | Parts by Weight (grams) |
|---|---|---|
| I | isophorone diisocyanate | 1000 |
| | TERACOL 650[14] | 1314 |
| | 1,4-butanediol | 50 |
| | methyl amyl ketone | 578 |
| | dibutyltin dilaurate | 0.3 |
| II | epsilon-caprolactam | 465 |
| III | methyl amyl ketone | 129 |

[14]This hydroxyl terminated polyether is commercially available from E. I. DuPont de Nemours. It has a molecular weight of 650 and a nominal hydroxyl number of about 173.

This preparation was conducted in the manner described in Example I, above. The resultant product had a number average molecular weight of 1824 as determined by GPC using a polystyrene standard; a total solids content of 79.6 percent determined at 110° C. for one hour and a Gardner viscosity of Z-1.

EXAMPLE VI

This Example illustrates the preparation of a coating composition utilizing the urethane containing material of Example V and an evaluation of its physical properties.

| Ingredients | Parts by Weight (grams) |
|---|---|
| pigment paste[15] | 107.3 |
| blocked isocyanate terminated polyurethane[16] | 110.1 |
| dibutyltin dilaurate | 2.0 |
| diacetone alcohol | 39.4 |

[15]The pigment paste was prepared as follows:

| Ingredients | Parts by Weight (grams) |
|---|---|
| phosphatized epoxy of footnote (3) | 70.4 |
| dibutyltin dilaurate | 4.0 |
| diacetone alcohol | 54.7 |
| strontium chromate | 144.0 |
| titanium dioxide | 96.0 |
| diacetone alcohol | 100.0 |

The ingredients were combined together and ground to a number 7 Hegman grind using ceramic beads.

[16]Prepared in Example V, above.

The coating composition was prepared by combining together, in order, the ingredients listed above with mild agitation. The resultant composition had a total solids content of 60 percent.

The test panels for evaluation were prepared as in Example III, above. The cured films were also evaluated for pencil hardness, solvent resistance, and adhesion after fabrication as has been described in Example III. The cured film had an elongation of 200 percent to 300 percent determined with an Instron Tester according to ASTM D638-72.

The results are set out below.

| Pencil Hardness | Solvent Resistance (Double Rubs) | 3T (Cracks/Tape Off) | 2T (Cracks/Tape Off) |
|---|---|---|---|
| F | 48 | 9/9 | 8/9 |

EXAMPLE VII

This Example also illustrates a method of providing a substrate with a three coat multilayer coating system according to the present invention and an evaluation of its physical properties. This Example is identical to Example IV except that the primer utilized in this Example is that detailed in Example VI, above.

The results of the physical properties evaluation are set out in Table I.

TABLE I

| | THREE COAT MULTILAYER SYSTEMS | |
|---|---|---|
| Tests | Primer of Example IV | Primer of Example VI |
| Pencil Hardness | HB | HB |
| Solvent Resistance (greater than 100 double rubs) | no effect | no effect |
| Nickel Scratch | 7 | 3 |
| T-bend Adhesion (cracks/tape off) | | |
| 3T | 9/9 | 9/9 |
| 2T | 9/9 | 9/9 |
| Salt Spray* | | |
| scribe creepage | 8 | 6-5 |
| bend creepage | 10 | 10 |
| edge creepage | 7 | 7 |
| blisters | | |
| face | 10 | 10 |
| Humidity Resistance* | | |
| blisters | 10 | 2 |
| adhesion | 3 | 1 |
| Reverse Impact Resistance | | |

TABLE I-continued

| | THREE COAT MULTILAYER SYSTEMS | |
|---|---|---|
| Tests | Primer of Example IV | Primer of Example VI |
| (cracks/tape off) | | |
| 60 inch-pounds | 9/9 | 9/9 |
| 90 inch-pounds | 8/9 | 9/9 |
| 120 inch-pounds | 8/9 | 8/9 |

*1000 hours for the Example IV system.
500 hours for the Example VII system.

EXAMPLE VIII

This Example illustrates a method of providing a substrate with a two coat multilayer coating system according to the present invention. Three different two coat systems were prepared and evaluated for physical properties.

System A was prepared by coating a hot dip galvanized steel panel, in the manner described in Example III, above, with the coating composition of Example III. While still wet, the coated panel was coated with a polyester topcoat commercially available from PPG Industries, Inc., as POLYCRON® Super D topcoat. The panel was baked for 40 seconds to a peak metal temperature of 465° F. (240° C.).

System B was prepared in a manner identical to System A except that instead of a polyester topcoat a fluorocarbon based topcoat was utilized. This topcoat is commercially available from PPG Industries, Inc. as DURANAR® topcoat.

System C was prepared in a manner identical to system B except that instead of the polycarbonate based coating composition of Example III being used as a basecoat, the basecoat was the coating composition of Example VI. The topcoat was once again the DURANAR® topcoat.

Each two coat multilayer system was evaluated for physical properties according to the tests described in Examples III and IV. The results are set out below in Table II.

TABLE II

| | Two Coat Multilayer Systems | | |
|---|---|---|---|
| Tests | A | B | C |
| Pencil Hardness | F-H | H | HB |
| Solvent Resistance | no effect | no effect | no effect |
| (greater than 100 rubs) | | | |
| Nickel Scratch | 6 | 7 | 3 |
| T-Bend Adhesion | | | |
| (cracks/tape off) | | | |
| 3T | 5/9 | 9/9 | 9/9 |
| 2T | 4/9 | 9/9 | 8/9 |
| Salt Spray (1000 hrs) | | | |
| scribe creepage | 10 | 10 | 6 |
| bend creepage | 10 | 10 | 8 |
| edge creepage | 7 | 7 | 7 |
| blisters | | | |
| face | 10 | 10 | 10 |
| Humidity Resistance (1000 hrs) | | | |
| blisters | 10 | 9 | 5 |
| adhesion | 3 | 5 | 1 |
| Reverse Impact Resistance | | | |
| (cracks/tape-off) | 5/9 | 9/9 | 8/9 |
| 60-inch pounds | | | |

EXAMPLE IX

This Example illustrates the criticality of phosphatized polyepoxide essentially free of oxirane groups to the coating compositions of the present invention.

Part A

Comparison of phosphatized epoxide essentially free of oxirane groups to non-phosphatized (hydrolyzed) epoxide essentially free of oxirane groups.

The non phosphatized (hydrolyzed) epoxide was prepared in the following manner:

| Charge | Ingredients | Parts by weight (grams) |
|---|---|---|
| I | EPON 836 solution | 1086.0 |
| II | acetone | 2443.5 |
| | deionized water | 202.7 |
| III | fluoroboric acid (49 percent solution) | 5.64 |
| IV | sodium bicarbonate | 3.97 |
| | deionized water | 7.47 |
| V | diethylene glycol monobutyl ether | 560.0 |
| | methyl isobutyl ketone | 106.8 |

A suitably equipped reactor vessel was charged with (I) and heated in vacuo for a period of about 6 hours to a temperature of about 65° C. to 75° C. to distill off all solvents. The mixture was then stirred to cool. Subsequently, the reaction mixture was heated to about 50° C. under a nitrogen atmosphere and charge (II) was added. The mixture was allowed to reflux for about 90 minutes and then charge (III) was added. The reaction mixture was held at about 60° C. for 8 hours. Charges (IV) and (B) were then added under nitrogen atmosphere and refluxing continued for about 7 hours. The solvents were removed by distillation. The mixture was cooled to 80° C.

To the aforesaid mixture was added 500 grams of acetone. Some escaped by flashing off so an additional 19.9 grams were added. The mixture was maintained at 80° C., and an additional 200 grams of acetone added to facilitate filtering. The filtrate was heated to reflux under nitrogen atmosphere to strip the solvent. The resultant product had a number average molecular weight as determined by GPC using a polystyrene standard of 1024; a solids content of 58.8 percent determined for one hour at 150° C. and a viscosity of Z-Z1.

The coating compositions were as follows:

Composition 1

The coating composition detailed above in Example III utilizing phosphatized epoxide essentially free of oxirane groups.

Composition 2

This coating composition was identical to that of Example III except that it was formulated with the hydrolyzed epoxide detailed above.

Each composition was applied and evaluated for solvent resistance and pencil hardness as detailed in Example III. The panels were also evaluated for the amount of T-bend to which the panel could be subjected without any resulting tape removal of the film. The results are set out below:

| Composition | Pencil Hardness | Solvent Resistance | T-bend with no tapeoff |
|---|---|---|---|
| 1 | H | no effect (100 double rubs) | OT |
| 2 | H | 38 rubs | 1-2 T |

Each of these compositions was also utilized to prepare a two coat multilayer coating system using the POLYCRON® Super D polyester coating composition of Example VIII, above. The systems were evaluated under salt spray and humidity.

| | Two Coat Multilayer Systems | |
|---|---|---|
| | Composition 1 | Composition 2 |
| Salt Spray (1000 hours) | | |
| Scribe Creepage | 10 | 7 |
| Bend Creepage | 10 | 7 |
| Edge Creepage | 7 | 7 |
| Face Blisters | 10 | 10 |
| Humidity (1000 hours) | | |
| Blisters | 10 | 5 |

The non-phosphatized epoxide based system was poorer in solvent resistance, adhesion as measured by T-bend, and also in humidity and salt spray.

Part B

Comparison of phosphatized epoxide essentially free of oxirane groups to oxirane containing epoxide (non-phosphtized, unhydrolyzed).

The coating compositions were as follows:

Composition 3

The coating composition detailed above in Example III utilizing phosphatized epoxide essentially free of oxirane groups.

Composition 4

This coating composition was identical to that of Example III except that it was formulated with non-phosphatized, unhydrolyzed EPON 836.

Each composition was applied and evaluated for solvent resistance and pencil hardness as detailed in Example III. The results are:

| | Pencil Hardness | Solvent Resistance |
|---|---|---|
| Composition 3 | H | no effect (100 double rubs) |
| Composition 4 | H | 7 rubs |

The coating composition formulated with oxirane containing epoxide did not cure well since the film was easily marred and the substrate visible after only 7 double rubs with solvent.

What is claimed is:

1. A coating composition comprising:
   (i) an isocyanate terminated urethane containing material; and
   (ii) a phosphatized polyepoxide essentially free of oxirane groups.

2. The coating composition of claim 1 wherein the phosphatized polyepoxide essentially free of oxirane groups is present as an isocyanate terminated prepolymer formed by reacting at least a portion of the hydroxyl groups of polyepoxide essentially free of oxirane groups with an organic polyisocyanate.

3. The coating composition of claim 2 wherein there is additionally present an active hydrogen containing material.

4. The composition of claim 1 wherein the isocyanate terminated urethane containing material is prepared from a polyol component and an organic polyisocyanate.

5. The coating composition of claim 1 wherein the isocyanate groups of the isocyanate terminated urethane containing material are blocked.

6. The coating composition of claim 4 wherein the polyol component which is utilized to prepare the isocyanate terminated urethane containing material is comprised of a polycarbonate polyol.

7. The coating composition of claim 6 having an elongation of at least 50 percent when cured.

8. The coating composition of claim 6 wherein the polyol component is a mixture of polymeric polycarbonate diol and at least one other monomeric diol.

9. The coating composition of claim 6 wherein the polycarbonate polyol has a number average molecular weight within the range of from about 150 to about 10,000.

10. The coating composition of claim 8 wherein the polycarbonate diol is prepared from 1,6-hexanediol and ethylene carbonate.

11. The coating composition of claim 1 wherein the organic polyisocyanate is a diisocyanate.

12. The coating composition of claim 11 wherein the diisocyanate is isophorone diisocyanate.

13. The coating composition of claim 5 wherein the isocyanate groups of the isocyanate terminated urethane containing material are blocked with epsilon-caprolactam.

14. The coating composition of claim 1 wherein the phosphatized polyepoxide essentially free of oxirane groups has a molecular weight within the range of from about 200 to about 100,000.

15. The coating composition of claim 1 wherein the ratio of hydroxyl equivalents in the phosphatized polyepoxide to the isocyanate equivalents in the isocyanate terminated urethane containing material ranges from about 0.5:1.0 to 1.5:1.0.

16. The coating composition of claim 7 wherein the composition has an elongation ranging from about 200 percent to about 300 percent when cured.

17. A method of providing a substrate with a multilayer coating comprising:
    (a) applying a flexible primer coating composition to a substrate, said coating composition comprising (i) an isocyanate terminated urethane containing material; and (ii) a phosphatized polyepoxide essentially free of oxirane groups.
    (b) applying at least one pigmented coating composition to the coated substrate of (a);
    (c) at least partially curing the coated substrate of step (b);
said multilayer coating having an elongation of at least 50 percent when cured.

18. The method of claim 17 additionally comprising the step of applying a clear coating composition to the coated substrate of step (b), prior to at least partially curing the coated substrate.

19. The method of claim 17 wherein the pigmented coating composition of step (b) comprises a fluorocarbon polymer.

20. The method of claim 19 wherein the pigmented coating composition additionally comprises an adjuvant polymer different from the fluorocarbon polymer and adapted to modify properties of the fluorocarbon polymer.

21. The method of claim 20 wherein the adjuvant polymer is an acrylic polymer.

22. The method of claim 17 wherein the clear coating composition comprises a fluorocarbon polymer.

23. The method of claim 22 wherein the clear coating composition additionally comprises an adjuvant polymer different from the fluorocarbon polymer and adapted to modify the properties of the fluorocarbon polymer.

24. The method of claim 23 wherein the adjuvant polymer is an acrylic polymer.

25. The method of claim 17 wherein the dry film thickness of the primer coating composition ranges from about 0.2 mil to about 2.0 mil.

26. A coated article produced by the method of claim 17.

* * * * *